(12) United States Patent
Bharadwaj et al.

(10) Patent No.: US 12,375,431 B2
(45) Date of Patent: Jul. 29, 2025

(54) NON-DISRUPTIVE TRADING OF BUFFERS BETWEEN PORTS OR PORT VIRTUAL LANES OF A CREDITED NETWORK

(71) Applicant: Cisco Technology, Inc., San Jose, CA (US)

(72) Inventors: Harsha Bharadwaj, Bangalore (IN); Rajesh L G, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/407,168

(22) Filed: Jan. 8, 2024

(65) Prior Publication Data

US 2025/0227076 A1    Jul. 10, 2025

(51) Int. Cl.
| | | |
|---|---|---|
| *G06F 15/16* | (2006.01) | |
| *H04L 47/10* | (2022.01) | |
| *H04L 49/9005* | (2022.01) | |
| *H04L 49/9047* | (2022.01) | |

(52) U.S. Cl.
CPC .......... *H04L 49/9047* (2013.01); *H04L 47/39* (2013.01); *H04L 49/9005* (2013.01)

(58) Field of Classification Search
CPC .. H04L 47/39; H04L 49/9005; H04L 49/9047
USPC ....................................................... 709/226
See application file for complete search history.

(56) References Cited

U.S. PATENT DOCUMENTS

| | | | | |
|---|---|---|---|---|
| 6,108,692 A | * | 8/2000 | Van Seters | H04L 49/901 709/213 |
| 7,139,240 B2 | * | 11/2006 | Kreuzenstein | H04L 47/33 370/235 |
| 7,301,898 B1 | | 11/2007 | Martin et al. | |
| 7,474,613 B2 | * | 1/2009 | Bergamasco | H04L 47/10 370/235 |
| 7,535,907 B2 | * | 5/2009 | Hussain | H04L 49/90 370/469 |
| 7,787,375 B2 | * | 8/2010 | Dickens | H04L 67/1097 370/231 |
| 7,975,027 B2 | * | 7/2011 | Dickens | H04L 47/10 370/231 |
| 9,182,941 B2 | * | 11/2015 | Mathur | H04L 47/26 |
| 11,277,356 B2 | * | 3/2022 | Catalano | H04L 67/1097 |
| 11,297,006 B1 | | 4/2022 | Bharadwaj | |

(Continued)

OTHER PUBLICATIONS

Search Report and Written Opinion for International Application No. PCT/US25/010711, Dated Mar. 26, 2025, 12 pages.

*Primary Examiner* — Moustafa M Meky
(74) *Attorney, Agent, or Firm* — Lee & Hayes, P.C.

(57) ABSTRACT

Techniques for moving buffers between ports, or virtual lanes of a port, of a networking device of a credited network while maintaining the ports in an active state without dropping any frames. The techniques may include determining that a number of buffers are to be reallocated from a first port of a networking device to a second port of the networking device. The techniques may also include causing a peer port connected to the first port to decrement, by the number, a transmit credit counter associated with the peer port. Based at least in part on determining that the peer port decremented the transmit credit counter, the first port may release the number of the buffers from a buffer pool associated with the first port, and the number of the buffers may be reallocated to the second port.

20 Claims, 13 Drawing Sheets

(56) References Cited

U.S. PATENT DOCUMENTS

| | | | |
|---|---|---|---|
| 11,700,214 B1* | 7/2023 | Yokoi | H04L 49/9052 |
| | | | 370/412 |
| 12,113,721 B2* | 10/2024 | Yokoi | H04L 49/9005 |
| 2003/0202474 A1* | 10/2003 | Kreuzenstein | H04L 47/39 |
| | | | 370/235 |
| 2004/0027987 A1* | 2/2004 | Bergamasco | H04L 47/39 |
| | | | 370/229 |
| 2006/0227811 A1* | 10/2006 | Hussain | H04L 69/163 |
| | | | 370/503 |
| 2010/0095025 A1 | 4/2010 | Ko | |
| 2010/0128607 A1 | 5/2010 | Dropps | |
| 2015/0193201 A1* | 7/2015 | Mathur | H04L 47/27 |
| | | | 710/56 |
| 2017/0026300 A1 | 1/2017 | Rimmer et al. | |
| 2022/0052968 A1* | 2/2022 | Catalano | H04L 41/147 |
| 2022/0067713 A1 | 3/2022 | Tietz | |
| 2023/0328008 A1* | 10/2023 | Yokoi | H04L 49/9052 |
| | | | 370/412 |
| 2025/0016119 A1* | 1/2025 | Yokoi | H04L 49/90 |

\* cited by examiner

NON-DISRUPTIVE TRADING OF BUFFERS BETWEEN PORTS OR PORT VIRTUAL LANES OF A CREDITED NETWORK

TECHNICAL FIELD

The present disclosure relates generally to techniques for, among other things, moving buffers/buffer credits between ports or virtual lanes of a port while maintaining the ports/virtual lanes in an active state without dropping any frames.

BACKGROUND

Credited networks, such as Fibre Channel (FC), InfiniBand, etc., utilize credit-based flow control mechanisms for frame transmission to prevent frame loss and link overload. For instance, Fibre Channel (FC) defines a credit-based flow control mechanism based on buffer to buffer (B2B) crediting that prevents frame-loss/retransmission, giving maximum performance for inputs and outputs transported over a Fibre Channel Storage Area Network (FC-SAN). This flow control ensures devices (hosts or storage) connected to a FC fabric are never overwhelmed with FC frames. Today, buffer credits allocated to a certain port are negotiated with its peer during link up and buffer credit counters are set accordingly. However, once the FC link is up and operational, any further adjustment of buffers is not possible unless the links are brought down, and the buffer credits are reallocated during another link up.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1A:
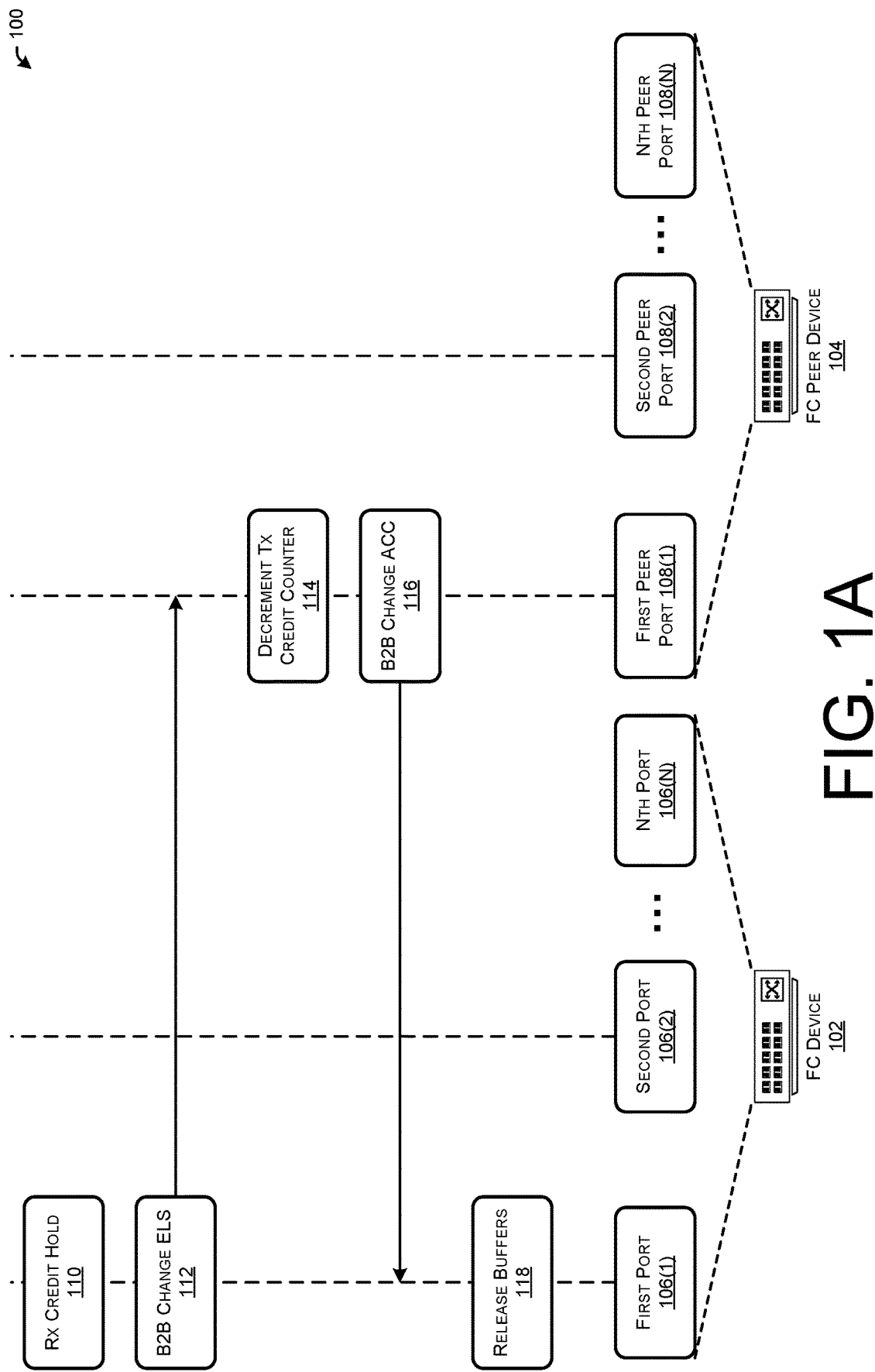
FIGS. 1A and 1B collectively illustrate an example process for moving buffer credits between active ports using a receive credit hold method in accordance with the techniques disclosed herein.

This disclosure describes various technologies for moving buffers/buffer credits between ports and/or virtual lanes (VLs) of a port while maintaining the ports and/or VLs in an active state without dropping any frames. By way of example, and not limitation, the techniques described herein may include determining that a number of buffers allocated to a first port of an FC device are to be reallocated to a second port of the FC device. The techniques may also include causing a peer port connected to the first port to decrement, by the number, a transmit credit counter associated with the peer port. Based at least in part on determining that the peer port decremented the transmit credit counter, the first port may release the number of the buffers from a buffer pool associated with the first port. The techniques may also include causing a reallocation of the number of the buffers (e.g., the released buffers) to the second port.

Additionally, the techniques described herein may be performed as a method and/or by a system having non-transitory computer-readable media storing computer-executable instructions that, when executed by one or more processors, performs the techniques described above and herein.

Example Embodiments

As briefly discussed above, credited networks (e.g., Fibre Channel, InfiniBand, etc.) utilize credit-based flow control mechanisms for frame transmission. For instance, Fibre Channel (FC) defines a credit-based flow control mechanism based on buffer to buffer (B2B) crediting that prevents frame-loss/retransmission for FC frame transmission (e.g., sending data between two FC ports or Virtual Channels of an FC device or endpoint device with FC ports), giving maximum performance for input and output transported over a Fibre Channel Storage Area Network (FC-SAN). This flow control ensures devices (hosts or storage) connected to an FC fabric are not overwhelmed with FC frames. In this framework, each credit represents the availability of a buffer at a receiver FC port to receive a maximum sized FC frame. After a FC port dequeues received frames for processing and frees the buffers, an acknowledgment is sent back to the transmitter port using a "Receive Ready" (R_RDY) primitive, a process known as credit return.

During a linkup handshake with a peer port, each end of the link informs the other end of the link on how many receive buffers/buffer credits it has available. The transmission end of the link at either side of the link maintains a live "Available Transmit (Tx) Credit" counter (oftentimes abbreviated as "AvlTxCredit") in the application-specific integrated circuit (ASIC). Additionally, a "Maximum Tx Credit" configurable option/register contains the number of receive buffers of the peer and acts as the cap on the value of the Available Tx Credit counter. The Available Tx Credit counter starts at a value equal to the number of receive (Rx) B2B credits of the peer and is decremented by one for every frame transmitted and incremented by 1 for every "R_RDY" received from the frame recipient port. This way, the Available Tx Credit counter at the transmitter end keeps track of the number of buffers/buffer credits available at the receiver end all the time. Frame transmission may continue as long as the Available Tx Credit counter is a non-zero value. However, if the counter drops to zero, no frames can be sent to that recipient port.

More recently, this basic FC B2B crediting principle has been extended to virtualize an FC link by partitioning a physical FC link into multiple logical links called "Virtual Lanes" (VLs) (also referred to as "Virtual Links") with dedicated buffers and credit accounting per-VL. The R_RDY credit return primitive is extended to define a VL aware R_RDY called "Extended R_RDY" (ER_RDY). The Priority field in the FC header is used to carry the VL information in every FC frame. VLs are also called as VCs (Virtual Circuits) and use a credit primitive called VC_RDY which is equivalent to ER_RDY.

Based on the underlying ASIC, the default buffer allocation divides buffers among all ports based on its type (e.g., E_Port, F_port). This default allocation may be changed, and buffers may be moved from one port to another via administrator configuration. This is because buffers are a scarce and costly resource on ASICs, so allocation has to be judiciously optimized. Until more recently, moving buffers from one port to another was primarily used to support long distance communication (e.g., 100 meter or greater) on some switch ports. However, this required operationally shutting down the long-distance port, configuring some ports to an out-of-service state and assigning all buffers of the out-of-service ports to the configured long-distance port in the ASIC. A port shutdown in this case is acceptable, and sometimes inevitable, since extending distance usually meant changing the transceiver (e.g., ELW optic) and cable on the port.

However, there are emerging use-cases other than distance extension which require changing the buffers/credits for a port/VL by borrowing from another port/VL. Such use cases in which buffers are needed to be moved across ports of the same ASIC may include, but not be limited to: a port experiencing persistent congestion that is to borrow buffers from a non-congested port to relieve congestion; on long distance FC links if the average frame size has significantly decreased, it may require additional buffers for the same distance and traffic rate compared to what was negotiated and allocated when the link was brought up; and/or depending on end-point buffer capabilities, moving buffers among switch F_Ports after the end point login, instead of the default equal distribution for all the F_Ports. In addition to this, use cases in which buffers are needed to be moved across VLs of a given port may include, but not be limited to: moving buffers from inactive VLs to active VLs, as well as moving buffers/credits to VLs that become active; changing of a VL template that requires reconfiguring buffer allocation to conform with the template; moving buffers/credits from unused or infrequently used VLs on certain F_Ports (e.g., VLs for a certain type of traffic that is rarely received) to VLs where traffic is expected; and/or moving buffers/credits between VLs based on end-point capabilities.

Today the buffers allocated to a port/VL are negotiated with the peer during link up and the Tx Credit ASIC counter is set accordingly at the peer end. Once the link is up and operational, no further adjustment of buffers is possible unless the links are brought down and buffer allocations are exchanged again with the peer during link up. As such, all of the above use-cases requiring buffer movement among ports/VLs of an ASIC would require a port flap. However, a flap of an operational port is undesirable due to its possibility of causing transit frame drops and its inherent port downtime risks. Even though FC-SANs are designed for highly available connectivity (e.g., end devices are dual connected to the fabric and inter-switch links (ISLs) are generally bundled together as a port channel), storage administrators are skeptical of a port flap since there is always some amount of uncertainty with path failovers in a production fabric. Furthermore, the link bring-up times at higher speeds are longer (e.g., 8-10 second bring-up times). As such, given the uncertainty and increased port downtime with link flaps, administrators would never willingly flap a port for any reason.

This disclosure describes technologies for dynamically moving buffers/credits across ports/VLs non-disruptively (e.g., no frame drops), without requiring a port flap or shutdown. The disclosed techniques are predominately described herein in the context of moving buffers across two operational ports of an ASIC of an FC device, however the same or similar techniques/concepts are equally applicable for moving buffers between two operational VLs/VCs of a port as well. The key to the solution is to ensure that the crediting logic constantly running on an operational link is not impacted by this buffer/credit movement and no frames are dropped. In some examples, the techniques of this disclose that enable this functionality involve intelligently reducing N (e.g., a desired number) Rx buffers from a first port (e.g., "Port A") while informing its peer port (e.g., "Port A1") to reduce its Tx buffer credits by N, and then increasing N Rx buffers at a second port (e.g., "Port B") while informing its peer port (e.g., "Port B1") to increase its Tx buffer credits by N.

The techniques disclosed herein are adaptable for various generations of ASICs and facilitate buffer movement for both directions of a link even if only one end of the link is capable. In other words, the techniques disclosed need hardware (ASIC) support only on one end of the link. The other end needs only software updates, no ASIC support is needed. Hence this technique can be used between a legacy ASIC port and a new port supporting this technique. In various implementations, the overall solution may involve both ASIC and software changes. With respect to the ASIC, two features may be enabled, referred to herein as a receive credit hold (abbreviated as "RxCREDHOLD") and a transmit credit hold (abbreviated as "TxCREDHOLD"), which help reduce buffers on an operational link without impacting credit accounting. In examples, the receive credit hold, when enabled, may hold back return of buffer credits to a peer port (e.g., refrains from issuing Tx R_RDY) after a frame is processed and its buffer is freed in the Rx direction of the port and facilitates buffer movement away from the port. In examples, the transmit credit hold, when enabled, may hold received credits (e.g., refrains from issuing Rx R_RDY) without transmitting frames in the Tx direction of the port and facilitates buffer movement away from its peer port. Enabling both of these features ensures that the disclosed techniques can work in a variety of different hardware scenarios, even when one end of the link is a non-legacy port and the other end of the link is, for instance, a legacy port that does not support receive credit hold and/or transmit credit hold features.

With respect to the software changes, the techniques herein introduce a two-stage handshake protocol among two operational ports to initiate and orchestrate the trading of buffers/credits. In examples, the first stage is between a port giving up buffers and its peer using RxCREDHOLD or a port taking buffers and its peer using TxCREDHOLD and a new B2B Change ELS (Extended Link Service) command. The second stage is between the port taking up the freed buffers and its peer using the B2B Change ELS. An internal messaging system (e.g., IPC) call among the two ports of the FC device between which buffers are moved is used to indicate the movement of buffers and transition from the first stage to the second stage. In some examples, the software handshake may be independent of the underlying port hardware and may be initiated from either end of the link. Based on which link direction the buffer/credit move has to take place, either the receive credit hold or the transmit credit hold ASIC feature may be used in combination with the software handshake protocol across a pair of ports. Accordingly, this disclosure describes various different methods that can be used to move buffers/credits between links.

One of these methods is a receive credit hold-based (RxCREDHOLD-based) method for buffer movement. As noted above, the receive credit hold (RxCREDHOLD) feature monitors Rx buffer occupancy on a port (e.g., receive port) and holds back returning credits (R_RDY) to a peer port (e.g., transmitting port) for up to a configurable value of "N" credits. In some examples, when the RxCREDHOLD feature is activated, N buffers are earmarked for movement. In some instances, as buffers free up, credits corresponding with those buffers may be held back instead of being returned as R_RDY to the peer port. As a result, the peer port end can only send up to (credit negotiated at link up minus N) frames and eventually N buffers can be freed at the port.

In examples, once the RxCREDHOLD marking of N buffers is complete, the software process may take over and the first stage of the process is that the port signals its peer to subtract N from its AvlTxCredit and MaxTxCredit counters. The second stage of the process acts on the port that borrows the buffers/credits and its peer. In examples, the Rx-CREDHOLD-based method may be initiated by software from an ASIC port. Further detail of the receive credit hold-based method for buffer movement between ports and VLs is described below with reference to FIGS. 1A and 1B.

Another method that may be used for buffer movement according to the techniques disclosed herein is a transmit credit hold-based (TxCREDHOLD-based) method. As noted above, the TxCREDHOLD feature may monitor the AvlTxCredit counter on a port and hold received credits (R_RDY) up to a programmable value of "M" (without incrementing the AvlTxCredit counter) and ensures that these credits are not used for frame transmission. This way, TxCREDHOLD may ensure that M buffers are kept free at the peer port. Once M credits are accumulated, the ASIC may cap the MaxTxCredit counter as (LinkUp negotiated TxCredit minus M) and the AvlTxCredit counter adjusts accordingly. TxCREDHOLD may then notify software with an interrupt, which proceeds to complete the B2B Change ELS transaction. The ASIC may also support a configurable timer, upon expiry of which if M Tx credits could not be held back, the TxCREDHOLD feature is aborted. However, the need to abort is unlikely to occur in many scenarios since it may be impractical to reduce buffers on a port with low credits/high link utilization.

In examples, various errors can be encountered during a buffer transfer using the RxCREDHOLD or TxCREDHOLD methods described above, and different actions can be taken to handle these different errors. For instance, when no traffic is flowing on the link, holding back credits may not be possible. For instance, if there is genuinely no traffic incoming on the link and the N buffers are unused anyways, the RxCREDHOLD can mark N free buffers for movement and proceed to the next stage of software messaging with the peer. However, the B2B Change ELS messaging from a port and the peer port decrementing the AvlTxCredit counter is not atomic. Due to this, frame transmission from peer port in this time window can cause issues. As an example, if the peer port transmits a burst of frames before it received the ELS message, it may use up all or part of the N buffers earmarked for moving at the port. If this situation is detected, the receive credit hold-based method may be considered a failure and an abort is notified to software so that the whole procedure can be reattempted. As another example, the peer port may also transmit frames in the time interval after it receives the ELS but before sending the ELS ACC. However, this situation is prevented by pausing frame transmission at the peer port for this short interval. This allows the procedure to proceed further.

As another example in which holding back credits may not be possible, if there is no traffic or very little traffic incoming on a link due to very few buffers available (e.g., due to congestion), then N free buffers may never become available on the port. Accordingly, this disclosure implements a timer associated with the RxCREDHOLD feature to check if N buffers ever become available on the port within that time. In some examples, if N buffers are not available after the timeout, a failure is declared and RxCREDHOLD is aborted.

The case when there is no traffic to transmit on the link is easy to handle on the Tx side of the port as the port may simply need to pause frame transmission, confirm AvlTxCredit is greater than or equal to M, and proceed to update the MaxTxCredit and AvlTxCredit counters. After this update, frame transmission can resume. In examples, the TxCREDHOLD-based method may be initiated by software from a peer legacy port connected to non-legacy port. The peer port may initiate this method by transmitting the B2B Change ELS to start the TxCREDHOLD function on the non-legacy port. Once the TxCREDHOLD is complete and ACC is received for the ELS, it proceeds to the second stage similar to the RxCREDHOLD-based method. Further detail of the transmit credit hold-based method for buffer movement between ports and VLs is described below with reference to FIGS. 2A and 2B.

By way of example, and not limitation, a method for moving buffers between FC ports and/or VLs while maintaining the FC ports/VLs in an active state, according to the techniques disclosed herein, may include determining that a number of buffers allocated to a first port of an FC device are to be reallocated to a second port of the FC device. For instance, the first port, the ASIC, the FC device, or the like may receive a request from an administrator to reallocate the buffers from the first port to the second port. Additionally, in some examples, the first port, the ASIC, the FC device, an FC-SAN controller, or the like may determine, based on monitoring the FC links, that the buffers should be reallocated. For instance, machine-learning or other AI techniques may be utilized to determine an optimum number of buffers for each port of an FC device, or for each VL of an FC port, and this may trigger the movement/reallocation of buffers from the first port to the second port. As one example, a determination may be made that the first port does not receive much traffic (e.g., less than a threshold amount) and that the second port is frequently congested (e.g., greater than a threshold amount) and the decision may be made to reallocate the buffers.

In some examples, the method may include determining whether to reallocate the buffers from the first port to the second port using a transmit credit hold process or a receive credit hold process based at least in part on capabilities associated with the FC device. For instance, if both the first port and the peer port are non-legacy ports, then either method can be used. If, however, the first port (e.g., receive port) is a legacy port and the peer port (e.g., transmitting port) is a non-legacy port, then the RxCREDHOLD-based process may be used. In contrast, if the first port (e.g., receive port) is a non-legacy port and the peer port (e.g., transmitting port) is a legacy port, then the TxCREDHOLD-based process may be used.

In examples, under the RxCREDHOLD-based approach, the method may include initiating the RxCREDHOLD feature to refrain from returning available credits (e.g., R_RDYs) to the peer port based at least in part on determining that the number of the buffers are to be reallocated from the first port to the second port. Additionally, the method may include determining that a total number of the available credits (e.g., Rx credits) meets or exceeds the number of buffers that are to be reallocated.

Under the TxCREDHOLD-based approach, the method may include causing a transmit credit hold (e.g., hold back R_RDYs) on the peer port based at least in part on determining that the number of the buffers are to be reallocated from the first port to the second port. The method may also include receiving, from the peer port, an indication that the peer port decremented the transmit credit counter by the number of the buffers to be reallocated. Based at least in part on receiving the indication, the first port may decrement a receive credit counter by the number and relinquish the number of the buffers.

In some examples, the method may include causing the peer port connected to the first port to decrement, by the number, a transmit credit counter associated with the peer port. In some instances, causing the peer port to decrement the transmit credit counter may include sending, to the peer port, an indication of the number of the buffers that are to be reallocated to the second port based at least in part on the total number of the available credits meeting or exceeding the number of the buffers. Additionally, or alternatively, causing the peer port to decrement the transmit credit counter may include initiating the TxCREDHOLD process on the peer port by sending a B2B change ELS message indicating the method to be used, the number of credits in question, and the operation to be performed (e.g., decrement). In some examples, the transmit credit counter may be indicative of at least one of a total number of the buffers allocated to the first port (e.g., MaxTxCredit) or a remainder of the total number of the buffers that are available for frame transmission from the peer port to the first port (e.g., AvlTxCredit).

In some examples, the method may also include releasing the number of the buffers from a buffer pool associated with the first port. For instance, releasing the number of the buffers from the buffer pool may be performed based at least in part on determining that the peer port decremented the transmit credit counter.

The method may also include, in some examples, causing a reallocation of the number of the buffers to the second port. In some instance, causing the reallocation of the number of the buffers to the second port may include increasing, by the number, a receive credit counter associated with the second port based at least in part on the first port releasing the number of the buffers from the buffer pool. For instance, after releasing the number of the buffers, the first port may send a B2B change IPC/internal message to the second port. The method may also include, in some examples, causing a second peer port connected to the second port to increase, by the number, a transmit credit counter associated with the second peer port. This ensures that the credit counters on both ends of the link are in sync and correctly correspond with the number of buffers for use on that link.

In various examples, the techniques described herein may be performed by FC devices, FC switches, endpoint devices with FC ports, and/or the like. For instance, and FC device or endpoint device may include a first port and a second port, and the FC device may transfer one or more buffers from the first port to the second port. Additionally, or alternatively, the techniques herein may be performed by an FC device to transfer one or more buffers from a first virtual channel of a port to a second virtual channel of the same port.

Certain implementations and embodiments of the disclosure will now be described more fully below with reference to the accompanying figures, in which various aspects are shown. However, the various aspects may be implemented in many different forms and should not be construed as limited to the implementations set forth herein. For instance, while several of the example implementations and embodiments described herein are illustrated in the context of FC devices and FC-based networks, the techniques disclosed herein are equally applicable to credit-based networking in general. For instance, the techniques disclosed herein can be applied to FC networks/devices, InfiniBand networks/device, and other credited networking technologies that utilize credit-based flow control mechanisms. The disclosure encompasses variations of the embodiments, as described herein. Like numbers refer to like elements throughout.

Figure 1B:
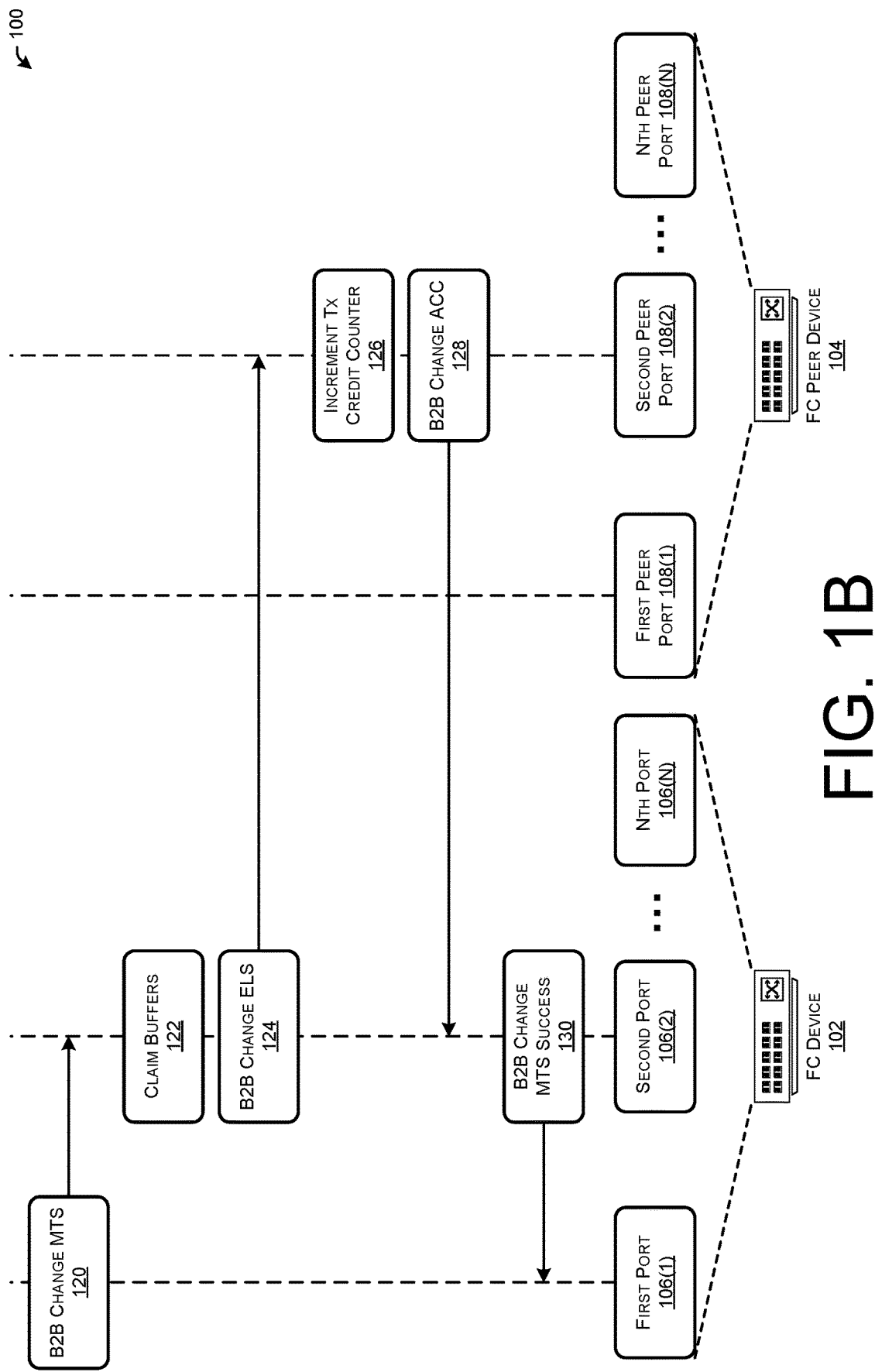

FIGS. 1A and 1B collectively illustrate an example process 100 for moving buffer credits between active FC ports using a receive credit hold method in accordance with the techniques disclosed herein. FIGS. 1A-5 include an FC device 102 and an FC peer device 104. In examples, the FC device 102 and the FC peer device 104 may each include a number of ports. For instance, the FC device 102 includes a first port 106(1), a second port 106(2), and an Nth port 106(N) (where N can represent any number). Likewise, the FC peer device 104 includes a first peer port 108(1), a second peer port 108(2), and an Nth peer port 108(N) (where N can represent any number). In examples, and as to be interpreted in each of FIGS. 1A-5, the first port 106(1) is connected to the first peer port 108(1), the second port 106(2) is connected to the second peer port 108(2), and so forth. Furthermore, it is to be understood that the FC peer device 104, as well as the peer ports 108(1)-108(N), are referred to in FIGS. 1A-5 as a "peer device" and "peer ports" for ease of illustration and understanding. That is, the FC peer device 104 and the peer ports 108(1)-108(N) are named this way in this disclosure because, in the following examples, the buffers are being transferred on the ports of the FC device 102. As such, nothing would prevent the FC peer device 104 and its ports from moving buffers between its own ports if it was so desired.

The various operations illustrated in FIG. 1A correspond with the first stage of the RxCREDHOLD-based process described herein. The process 100 begins at operation 110, which includes enabling the RxCREDHOLD feature on the first port 106(1). When this feature is enabled, the ASIC may mark N buffers of the first port 106(1) for the giveaway and as buffers are freed, starts holding back credit return (e.g., R_RDY) to the first peer port 108(1) up to the value N. This ensures that N Rx buffers are made available at the first port 106(1).

At times of link congestion, it may be possible that N Rx buffers are not available and not enough traffic is flowing on the link. This situation never gives RxCREDHOLD a chance to hold back up to N credits. So, even though N Rx buffers are earmarked, fewer than N credits are actually capable of being held back. For these situations, a timer may be used in association with RxCREDHOLD after which the RxCRED- HOLD is aborted and the same is informed to the admin. As such, the admin may need to retry the procedure after the congestion situation improves. In examples, RxCRED- HOLD may timeout for various reasons, such as when buffers are free, but no traffic is flowing, hence no R_RDYs are being exchanged, as well as the case in which the port is congested, hence all buffers are used up, and not being released due to congestion. So not enough R_RDYs are being returned.

After the RxCREDHOLD earmarks N Rx buffers, at operation 112 the first port 106(1) sends a B2B Change ELS message to the first peer port 108(1) to indicate its intent to relinquish N buffers. In some examples, the payload of this message may carry information indicating that the RxCREDHOLD method is being used, the number of credits at issue, and the operation (e.g., decrease credits). Upon receiving this B2B Change ELS message, the first peer port 108(1) may stop frame transmitting until the ACC is sent for the ELS to prevent traffic bursts using up earmarked buffers at the first port 106(1).

In some examples, while the B2B ELS is on transit on the wire, a burst of traffic can still arrive at the first port 106(1) using the N buffers marked for give up. This can happen because the AvlTxCredit counter of the first peer port 108(1) has still not been updated. This burst can be detected at the first peer port 108(1) itself by checking if the average value of the live AvlTxCredit is less than N. If so, the first peer port 108(1) may abort the process by sending a RJT to the ELS message. The RJT response will fail the admin config at the first port 106(1) to move N buffers, and the admin can retry the command.

However, assuming no burst in traffic are encountered, at operation 114 the first peer port 108(1) decrements its Tx credit counter(s). For instance, the first peer port 108(1) may subtract N from the AvlTxCredit counter and/or MaxTx- Credit counter. Then, at operation 116, the first peer port 108(1) may send a B2B Change ACC message to the first port 106(1), and then resume frame transmission thereafter.

After the first port 106(1) receive the B2B Change ACC message, the intent of the first port 106(1) to give up N buffers is complete and, at operation 118, the first port 106(1) may release N buffers from its buffer pool. The process then may proceed to the second stage which is illustrated in FIG. 1B.

Turning to FIG. 1B, at operation 120 the first port 106(1) sends a B2B change IPC to the second port 106(2) indicating that it has given up N buffers for claiming by the second port 106(2). At operation 122, the second port 106(2) claims the buffers and increases its buffer allocation by N. Then, at operation 124, the second port 106(2) sends a B2B Change ELS message to the second peer port 108(2) indicating the number of credits to increase.

Upon the second peer port 108(2) receiving the B2B Change ELS message, at operation 126 the second peer port 108(2) may increment its Tx credit counter(s) (e.g., AvlTx- Credit and MaxTxCredit counters) by N. At operation 128, the second peer port 108(2) may send a B2B Change ACC message to the second port 106(2). Upon receiving the B2B Change ACC message, the second port 106(2), at operation 130, may send a B2B Change IPC Success message to the first port 106(1) indicating that the buffer exchange was successful.

Figure 2A:
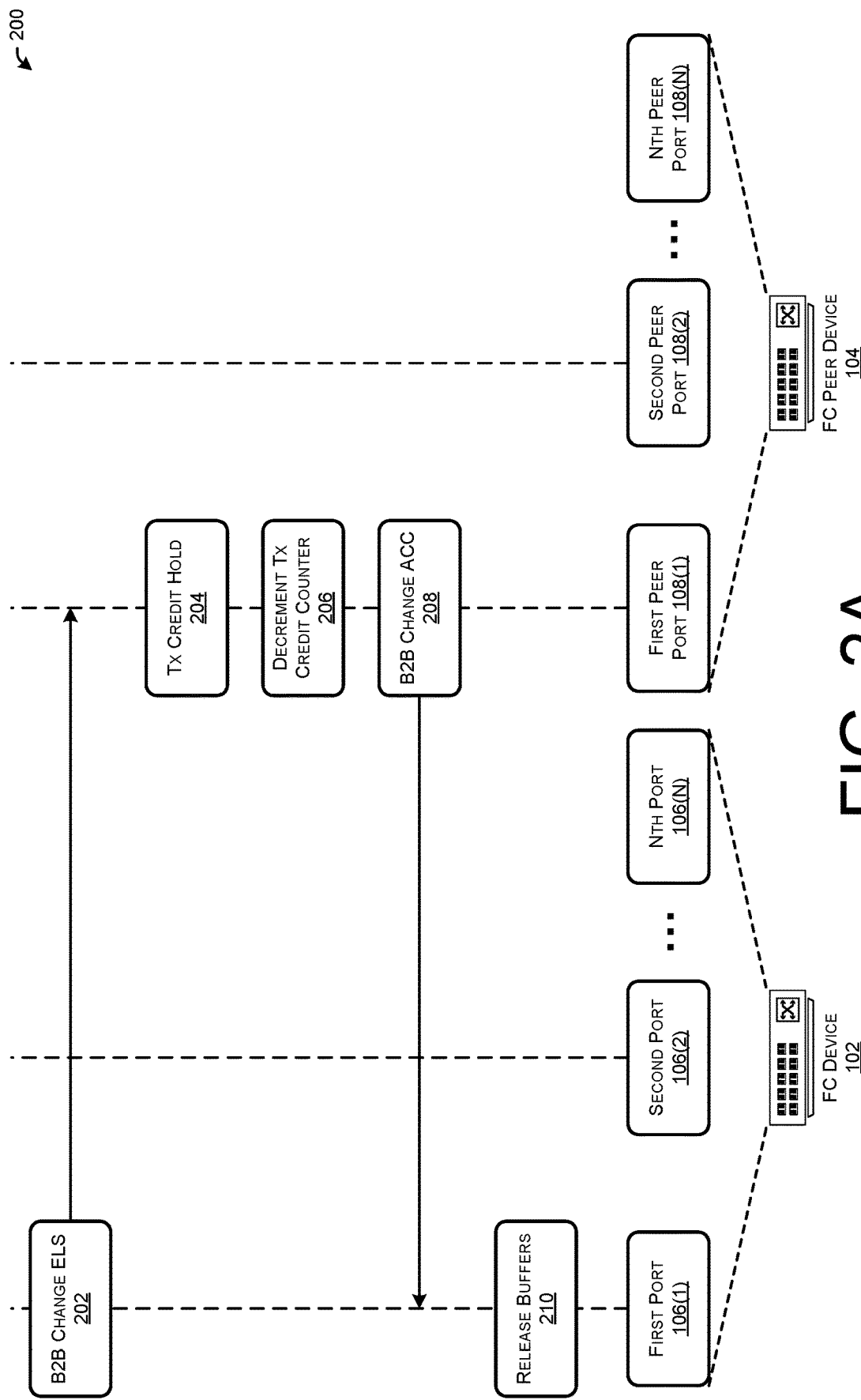
FIGS. 2A and 2B collectively illustrate an example process for moving buffer credits between active ports using a transmit credit hold method in accordance with the techniques disclosed herein.
Figure 2B:
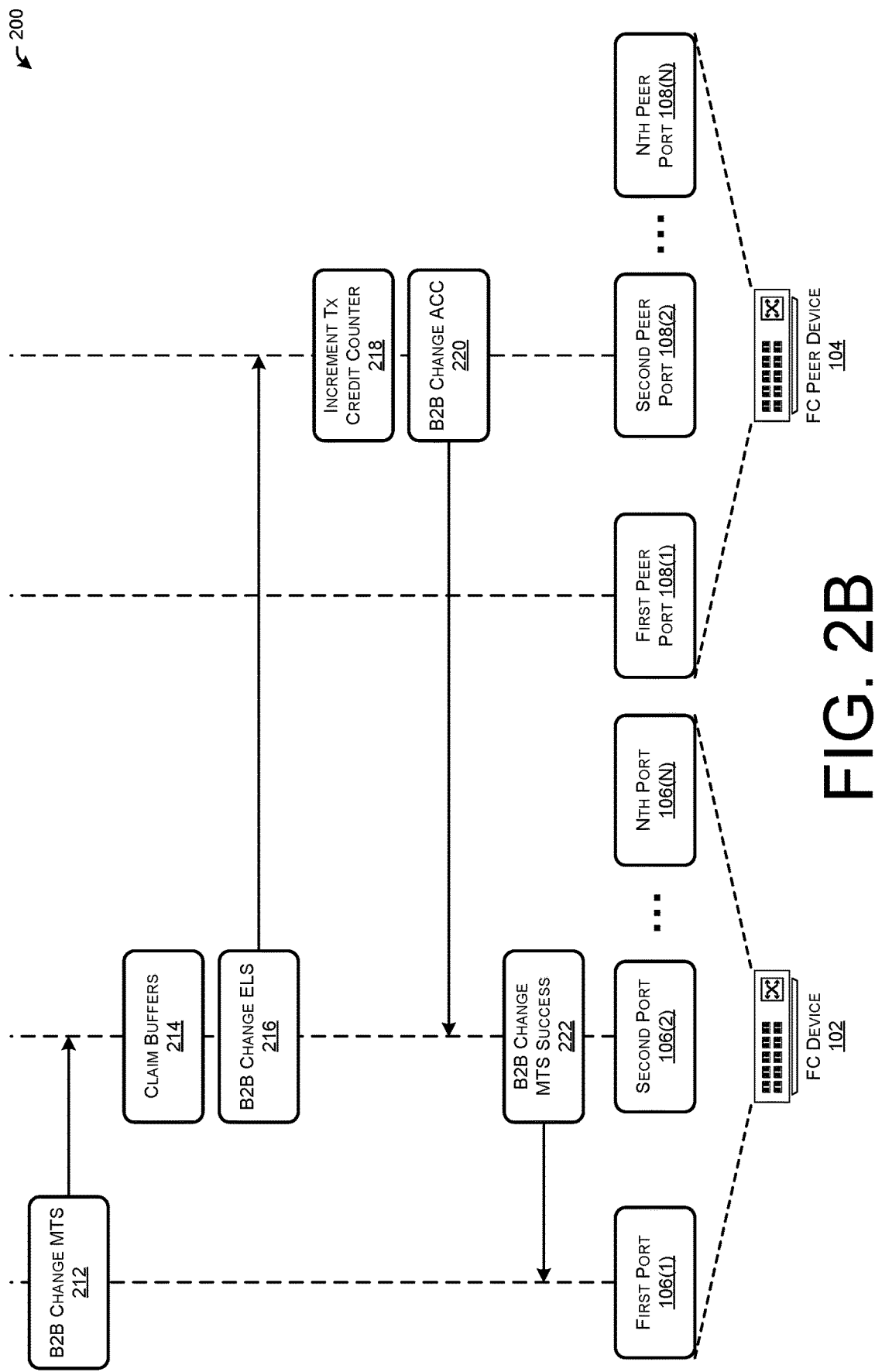

FIGS. 2A and 2B collectively illustrate an example process 200 for moving buffer credits between active FC ports using a transmit credit hold method in accordance with the techniques disclosed herein. The process 200 begins at operation 202, which includes the first port 106(1) sending a B2B Change ELS message to the first peer port 108(1) indicating the intent to relinquish M buffers. In some examples, the payload of the ELS message may indicate that the TxCREDHOLD method is to be used, the number of credits at issue, and the operation to decrease the credits/ buffers.

After receiving the B2B Change ELS message, the first peer port 108(1) may, at operation 204, enable the TxCRED- HOLD feature with a timeout value of T. If there is no traffic to transmit on the link, the first peer port 108(1) may pause transmitting frames and wait for AvlTxCredit value to be greater than or equal to M. This may be a hardware operation. Then, at operation 206, the first peer port 108(1) may decrement or otherwise update its Tx credit counter(s).

At times of link congestion or if there is traffic to be transmitted on the link, the first peer port 108(1), as part of the TxCREDHOLD process, may hold received credits in a new, separate Tx credit counter (TxCredAcc) without incrementing the AvlTxCredit counter and not transmitting of frames for these credits. When the separate TxCredAcc value is greater than or equal to M, the ASIC may deduct M credits from the MaxTxCredit counter. This results in capping the upper limit of AvlTxCredit counter and satisfies the intent of the first port 106(1) of giving up M buffers and the first peer port 108(1) reducing its Tx credits. If, however, the TxCredAcc never reached M and timeout T was exceeded, then the process may be aborted.

At operation 208, the first peer port may send a B2B Change ACC message to the first port 106(1). After the first port 106(1) receives the B2B Change ACC message, at operation 210, the first port 106(1) may release M buffers from its buffer pool. The process then may proceed to the second stage which is illustrated in FIG. 2B.

Turning to FIG. 2B, at operation 212 the first port 106(1) sends a B2B change IPC to the second port 106(2) indicating that it has given up M buffers for claiming by the second port 106(2). At operation 214, the second port 106(2) claims the buffers and increases its buffer allocation by M. Then, at operation 216, the second port 106(2) sends a B2B Change ELS message to the second peer port 108(2) indicating the number of credits to increase.

Upon the second peer port 108(2) receiving the B2B Change ELS message, at operation 218 the second peer port 108(2) may increment its Tx credit counter(s) (e.g., AvlTx- Credit and MaxTxCredit counters) by M. At operation 220, the second peer port 108(2) may send a B2B Change ACC message to the second port 106(2). Upon receiving the B2B Change ACC message, the second port 106(2), at operation 222, may send a B2B Change IPC Success message to the first port 106(1) indicating that the buffer exchange was successful.

Figure 3:
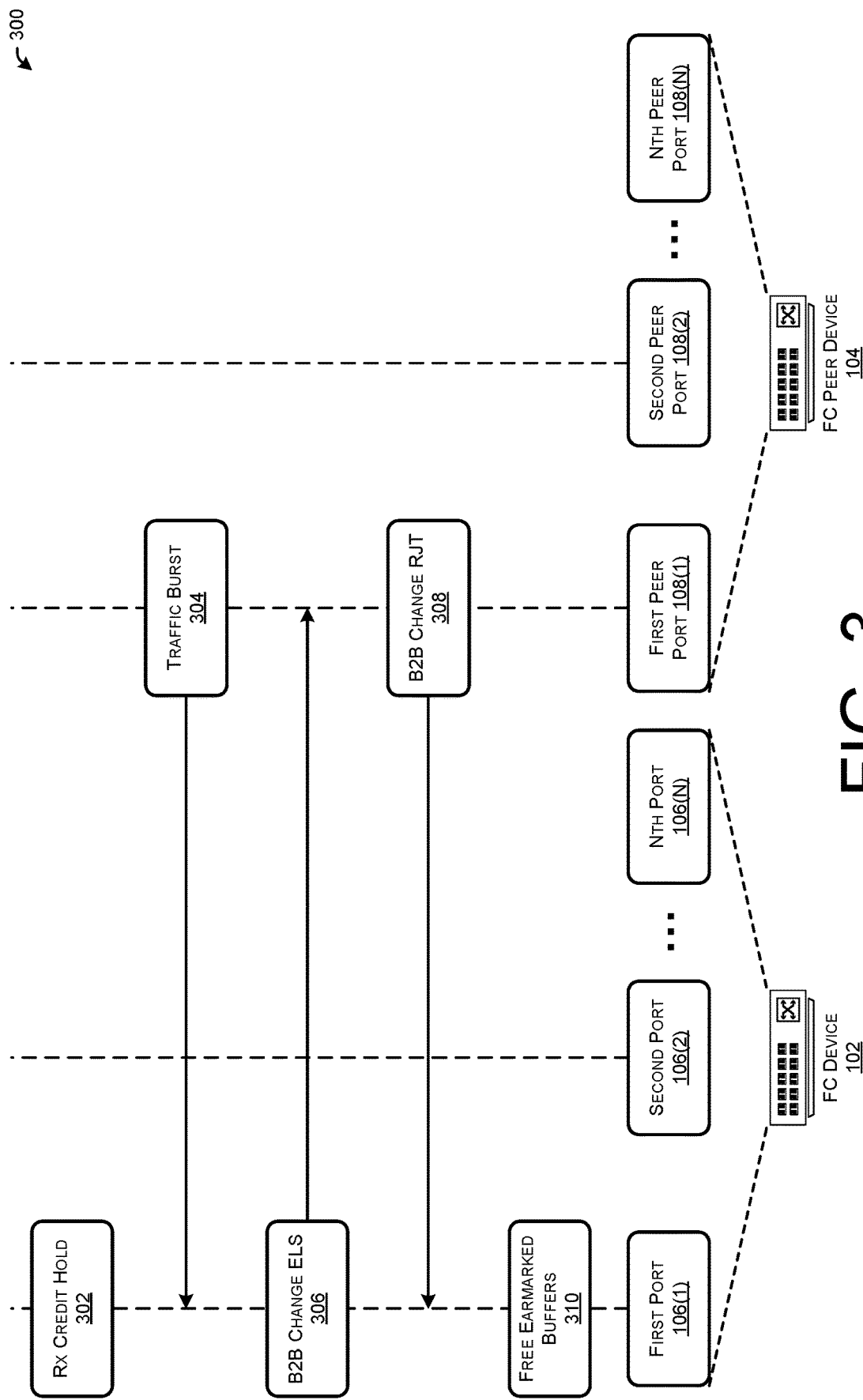
FIG. 3 illustrates an example process for responding to an exemplary failure during a buffer credit reallocation when a receive credit hold method is in use.
Figure 4:
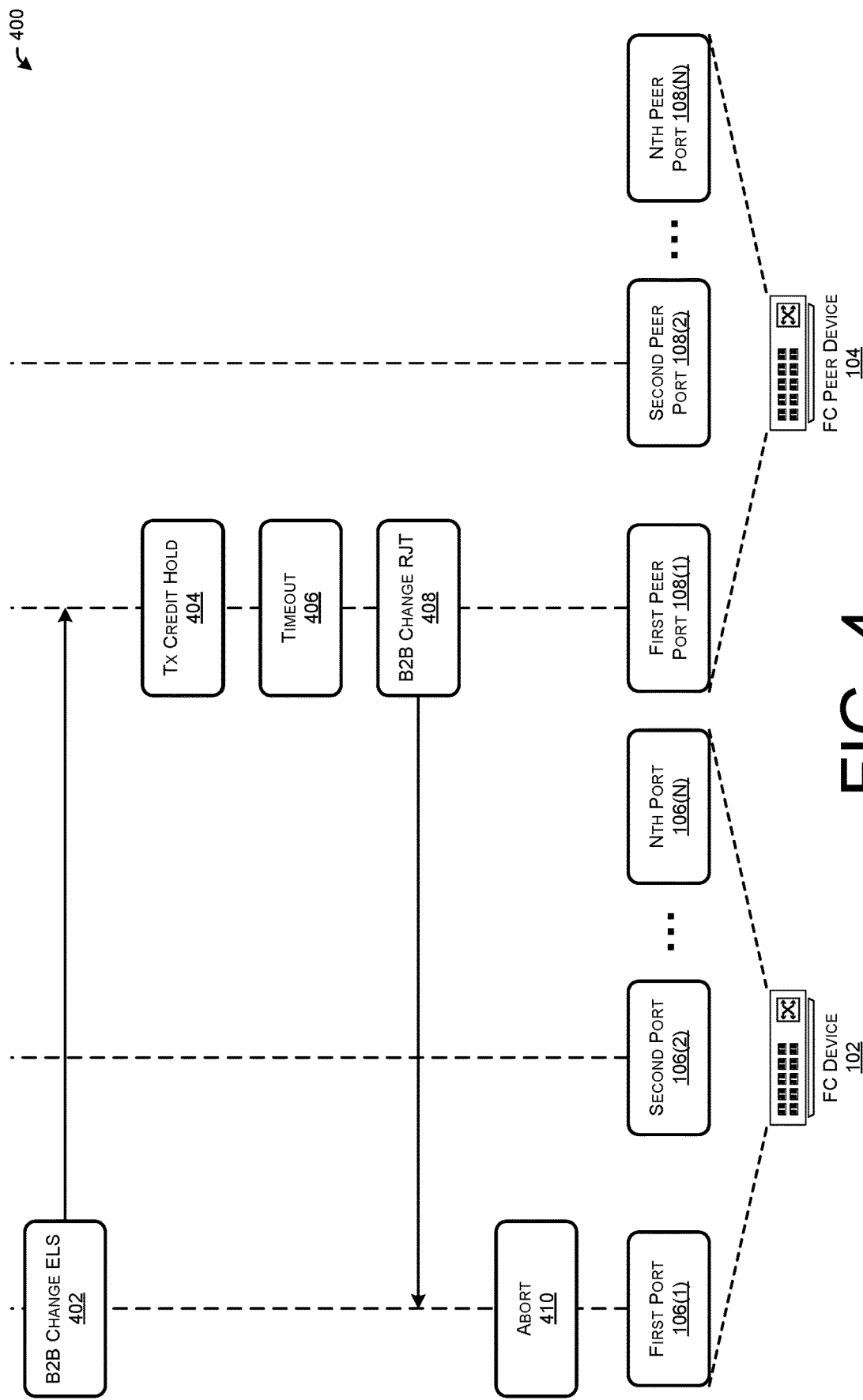
FIG. 4 illustrates an example process for responding to an exemplary failure during a buffer credit reallocation when a transmit credit hold method is in use.
Figure 5:
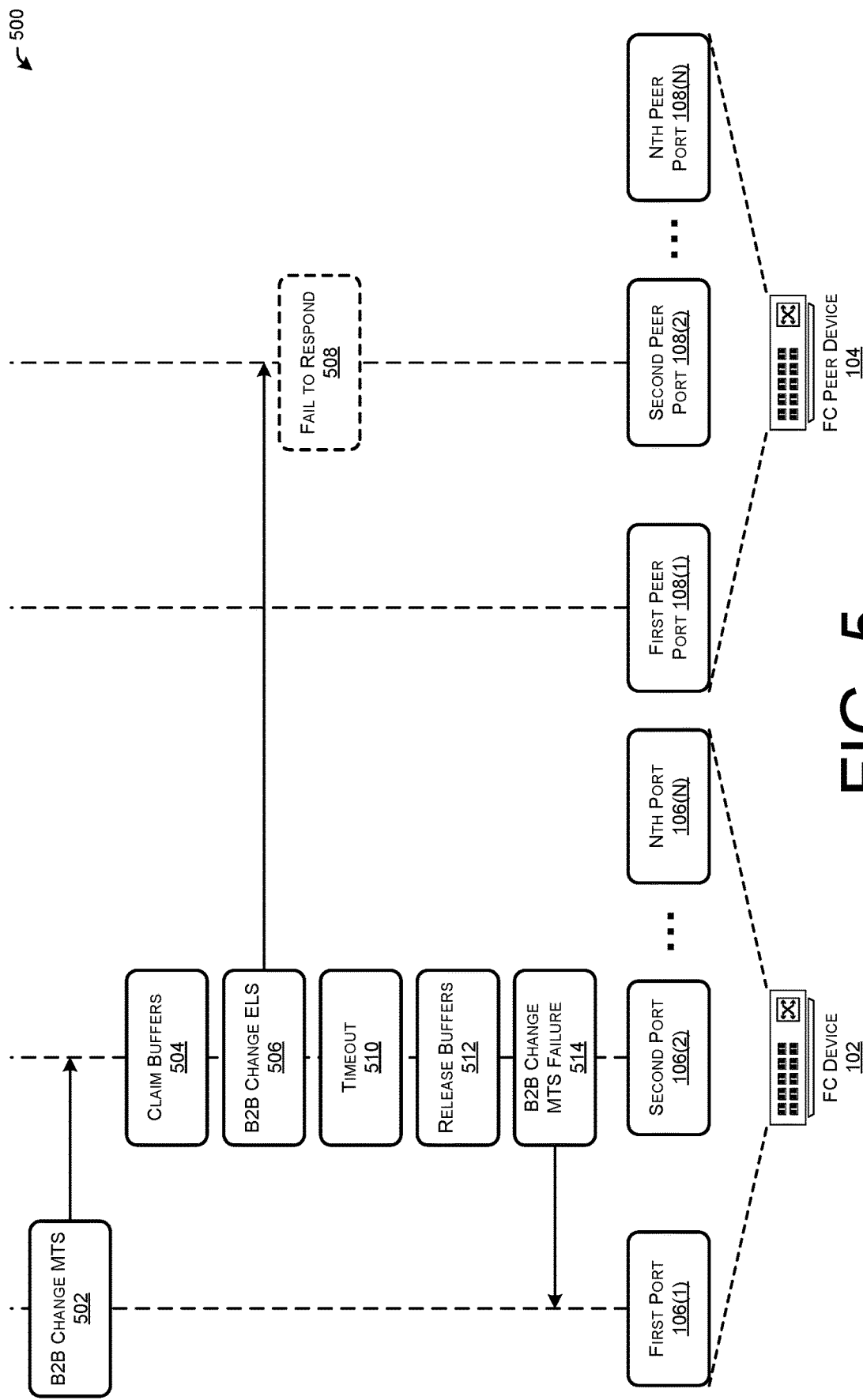
FIG. 5 illustrates an example process for responding to an exemplary failure during a buffer credit reallocation when the buffer credits have already been released from a first port and claimed by a second port.

Under both of the processes described above and herein, failures are possible which result in aborting the procedure as described earlier. For failure cases, the software may use a rollback scheme which will restore the buffers that were moved from a port and fail the admin configuration that triggered the buffer move. FIGS. 3-5 explained below illustrate some of these failures and the responses.

FIG. 3 illustrates an example process 300 for responding to an exemplary failure during a buffer credit reallocation when the receive credit hold-based method is in use. At operation 302, the Rx credit hold feature is enabled on the first port 106(1). When this feature is enabled, the ASIC may mark N buffers of the first port 106(1) for the giveaway and as buffers are freed, starts holding back credit return (e.g., R_RDY) to the first peer port 108(1) up to the value N. This ensures that N Rx buffers are made available at the first port 106(1).

After the RxCREDHOLD earmarks N Rx buffers, but before the first port 106(1) sends a B2B Change ELS message to the first peer port 108(1), at operation 304 a traffic burst begins from the first peer port 108(1) to the first port 106(1). The traffic burst may occur substantially simultaneously as operation 306 in which the first port 106(1) sends the B2B Change ELS message to the first peer port 108(1) to indicate its intent to relinquish N buffers. However, those earmarked buffers on the first port 106(1) will now be used to handle the traffic burst. As such, upon receiving this B2B Change ELS message, the first peer port 108(1) may, at operation 308, respond with a B2B Change RJT message. At operation 310, upon receiving the RJT message, the first port 106(1) may free the earmarked buffers.

FIG. 4 illustrates an example process 400 for responding to an exemplary failure during a buffer credit reallocation when a transmit credit hold method is in use. At operation 402, the first port 106(1) may send a B2B Change ELS message to the first peer port 108(1) indicating the intent to relinquish M buffers. In some examples, the payload of the ELS message may indicate that the TxCREDHOLD method is to be used, the number of credits at issue, and the operation to decrease the credits/buffers.

After receiving the B2B Change ELS message, the first peer port 108(1) may, at operation 404, enable the TxCREDHOLD feature with a timeout value of T. If there is no traffic to transmit on the link, the first peer port 108(1) may pause transmitting frames and wait for AvlTxCredit value to be greater than or equal to M. However, in this case, there is traffic on the link and, at operation 406, the timeout is reached before the AvlTxCredit value is greater than or equal to M. As such, at operation 408, the first peer port 108(1) sends a B2B Change RJT message to the first port 106(1). At operation 410, upon receiving the B2B Change RJT message, the first port 106(1) may abort the buffer transfer.

FIG. 5 illustrates an example process 500 for responding to an exemplary failure during a buffer credit reallocation when the buffer credits have already been released from a first port and claimed by a second port. That is, this exemplary failure may occur during the second stage of the buffer transfer process. At operation 502, the first port 106(1) may send a B2B Change IPC message to the second port 106(1). At operation 504, the second port 106(2) may claim the buffers relinquished from the first port 106(1).

At operation 506, the second port 106(2) may send a B2B Change ELS message to the second peer port 108(2). However, in operation 508 the second peer port 108(2) fails to respond to the B2B Change ELS message and, at operation 510, the timeout is reached. Upon reaching the timeout, at operation 512 the second port 106(2) may release the buffers it claimed from the first port 106(1). Thereafter, the second port 106(2), at operation 514, may send a B2B Change IPC failure message to the first port 106(1) so that the first port 106(1) may reclaim the buffers. In some examples, the buffers may remain free (e.g., unclaimed by the first port 106(1)) for the second port 106(2) to reattempt claiming.

Figure 6:
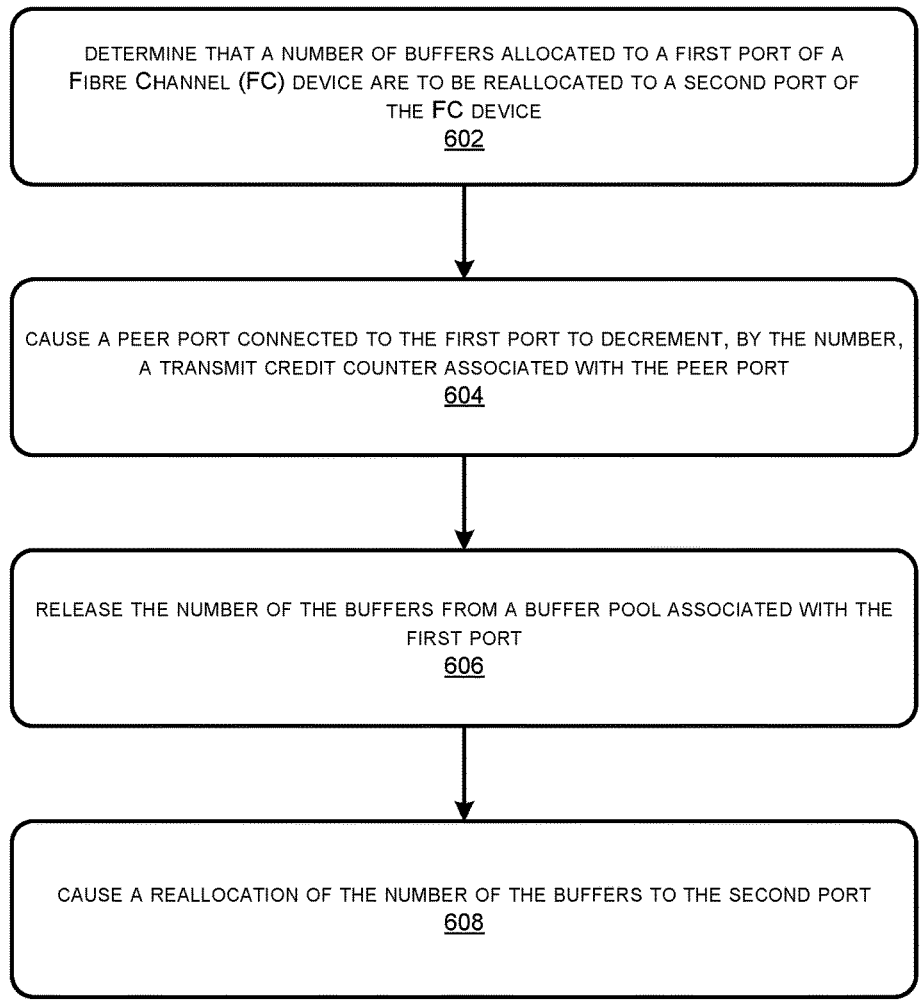
FIG. 6 is a flow diagram illustrating an example method for moving buffer credits between active ports in accordance with the technologies disclosed herein.
Figure 7:
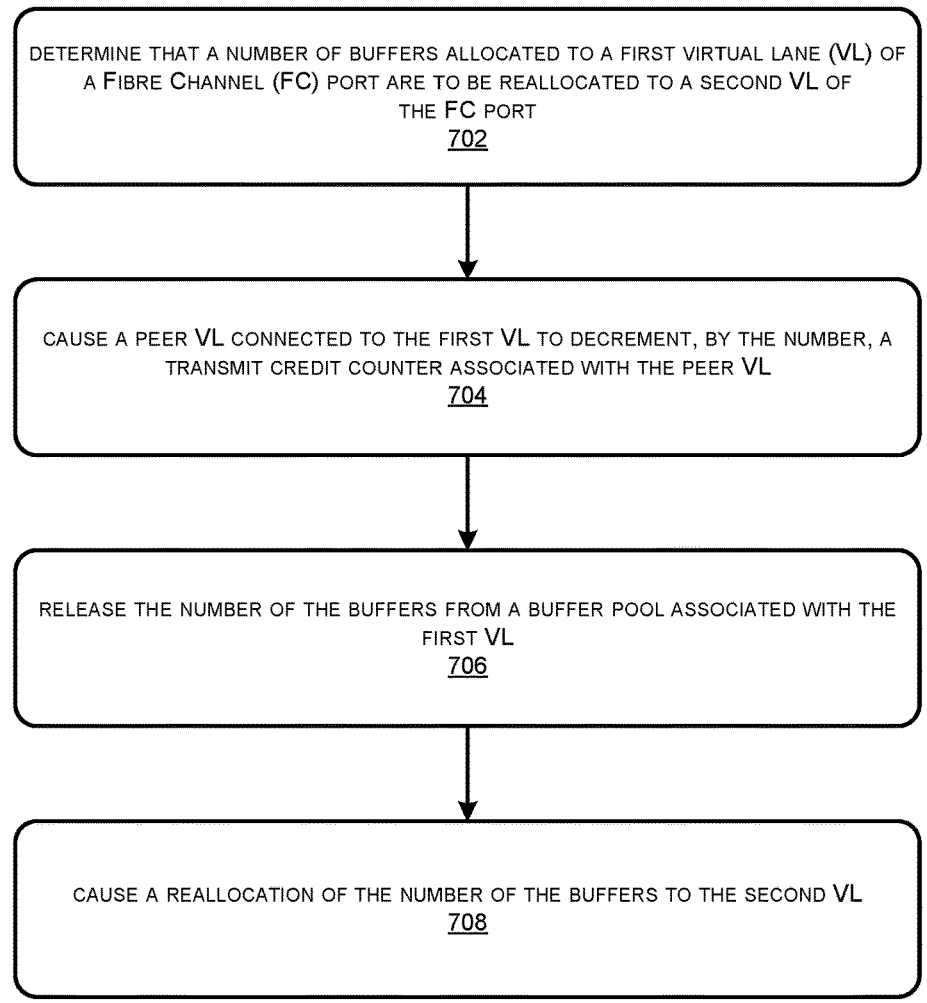
FIG. 7 is a flow diagram illustrating an example method for moving buffer credits between virtual lanes (VLs) of an active port in accordance with the technologies disclosed herein.
Figure 8:
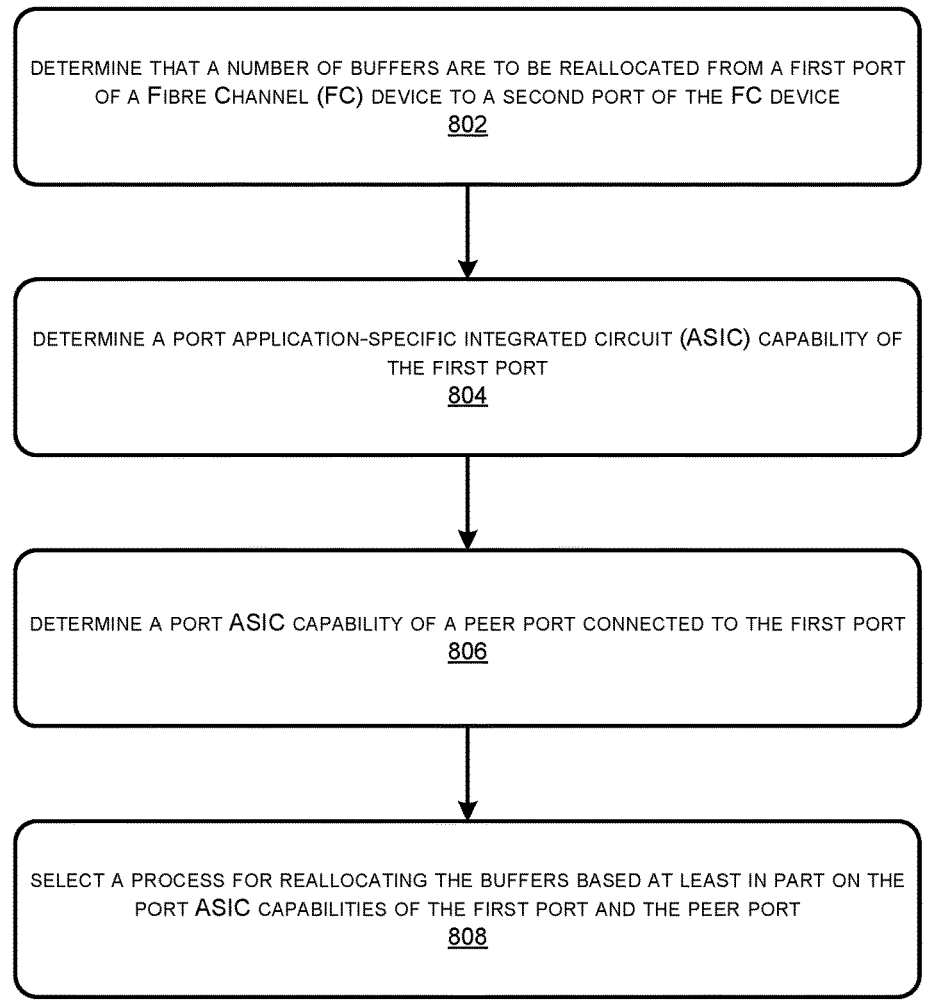
FIG. 8 is a flow diagram illustrating an example method for selecting a process to be used for reallocating buffer credits between active ports or VLs in accordance with the techniques disclosed herein.

FIGS. 6-8 are flow diagrams illustrating example methods 600, 700, and 800 associated with the techniques described herein. The logical operations described herein with respect to FIGS. 6-8 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIGS. 6-8 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 6 is a flow diagram illustrating an example method 600 for moving buffer credits between active FC ports in accordance with the technologies disclosed herein. The method 600 begins at operation 602, which includes determining that a number of buffers allocated to a first port of an FC device are to be reallocated to a second port of the FC device. For instance, the first port 106(1) of the FC device 102 may determine that a number of buffers are to be reallocated to the second port 106(2).

At operation 604, the method 600 includes causing a peer port connected to the first port to decrement, by the number, a transmit credit counter associated with the peer port. For instance, the first port 106(1) may cause the peer port to decrement, by the number, the transmit credit counter. In some examples, causing the peer port to decrement the transmit credit counter may be subsequent to the first port successfully holding back Rx credits or from the first port issuing a Tx credit hold to the peer port.

At operation 606, the method 600 includes releasing the number of the buffers from a buffer pool associated with the first port. For instance, the first port 106(1) may release the number of the buffers from the buffer pool. In some examples, releasing the buffers from the buffer pool may be at least partially responsive to receiving an indication from the peer port that the peer port decremented its Tx counters.

At operation 608, the method 600 includes causing a reallocation of the number of the buffers to the second port. For instance, the first port 106(1) may cause the reallocation of the number of the buffers to the second port 106(2) by sending a message to the second port 106(2) that the buffers are available.

FIG. 7 is a flow diagram illustrating an example method 700 for moving buffer credits between virtual lanes (VLs) of an active FC port in accordance with the technologies disclosed herein. While the method 700 describes a first VL that is connected to a peer VL, the method may be similar or the same if the first VL was connected to a peer port (e.g., a port that is not partitioned into multiple VL channels). The method 700 begins at operation 702, which includes determining that a number of buffers allocated to a first virtual lane (VL) of an FC port are to be reallocated to a second VL of the same FC port. For instance, the first port 106(1) of the FC device 102 may be virtually partitioned into multiple VLs, and each of those VLs may be allocated a certain number of buffers, which may be traded between VLs using the techniques disclosed herein.

At operation 704, the method 700 includes causing a peer VL (or peer port) connected to the first VL to decrement, by the number, a transmit credit counter associated with the peer VL. For instance, the first peer port 108(1) may be virtually partitioned into multiple VLs. In examples, the first VL may cause the peer VL to decrement, by the number, the transmit credit counter. In some examples, causing the peer VL to decrement the transmit credit counter may be subsequent to the first VL successfully holding back Rx credits or from the first VL issuing a Tx credit hold to the peer VL.

At operation 706, the method 700 includes releasing the number of the buffers from a buffer pool associated with the first VL. In some examples, releasing the buffers from the buffer pool may be at least partially responsive to receiving an indication from the peer VL that the peer VL decremented its Tx counters.

At operation 708, the method 700 includes causing a reallocation of the number of the buffers to the second VL. For instance, the first VL may cause the reallocation of the number of the buffers to the second VL by sending a message (e.g., B2B Change IPC message) to the second VL that the buffers are available.

FIG. 8 is a flow diagram illustrating an example method 800 for selecting a process to be used for reallocating buffer credits between active FC ports or VLs in accordance with the techniques disclosed herein. For instance, the method 800 may be used to determine whether a RxCREDHOLD process or TxCREDHOLD process is to be used for buffer transfer. In examples, either end of a link can independently decide which method will be picked to change the Rx buffers at a given port. Thus, the method 800 may be performed by a buffer transferring port or its peer port.

At operation 802, the method 800 includes determining that a number of buffers are to be reallocated from a first port of an FC device to a second port of the FC device. At operation 804, the method 800 includes determine a port application-specific integrated circuit (ASIC) capability of the first port. Similarly, at operation 806, the method 800 includes determining a port ASIC capability of a peer port connected to the first port. In examples, these ASIC capabilities may be exchanged between the ports during link up. In examples, the first port 106(1) and/or the first peer port 108(1) may perform some or all of the operations 802-806.

At operation 808, the method 800 includes selecting a process for reallocating the buffers based at least in part on the port ASIC capabilities of the first port and the peer port. For instance, the first port 106(1) and/or the first peer port 108(1) may select the process for reallocating the buffers based at least in part on the port ASIC capabilities of the first port 106(1) and the first peer port 108(1). As an example, if both the first port and the peer port are non-legacy ports, then either method can be used. If, however, the first port is a legacy port and the peer port is a non-legacy port, then the RxCREDHOLD-based process may be used. In contrast, if the first port is a non-legacy port and the peer port is a legacy port, then the TxCREDHOLD-based process may be used.

Figure 9:
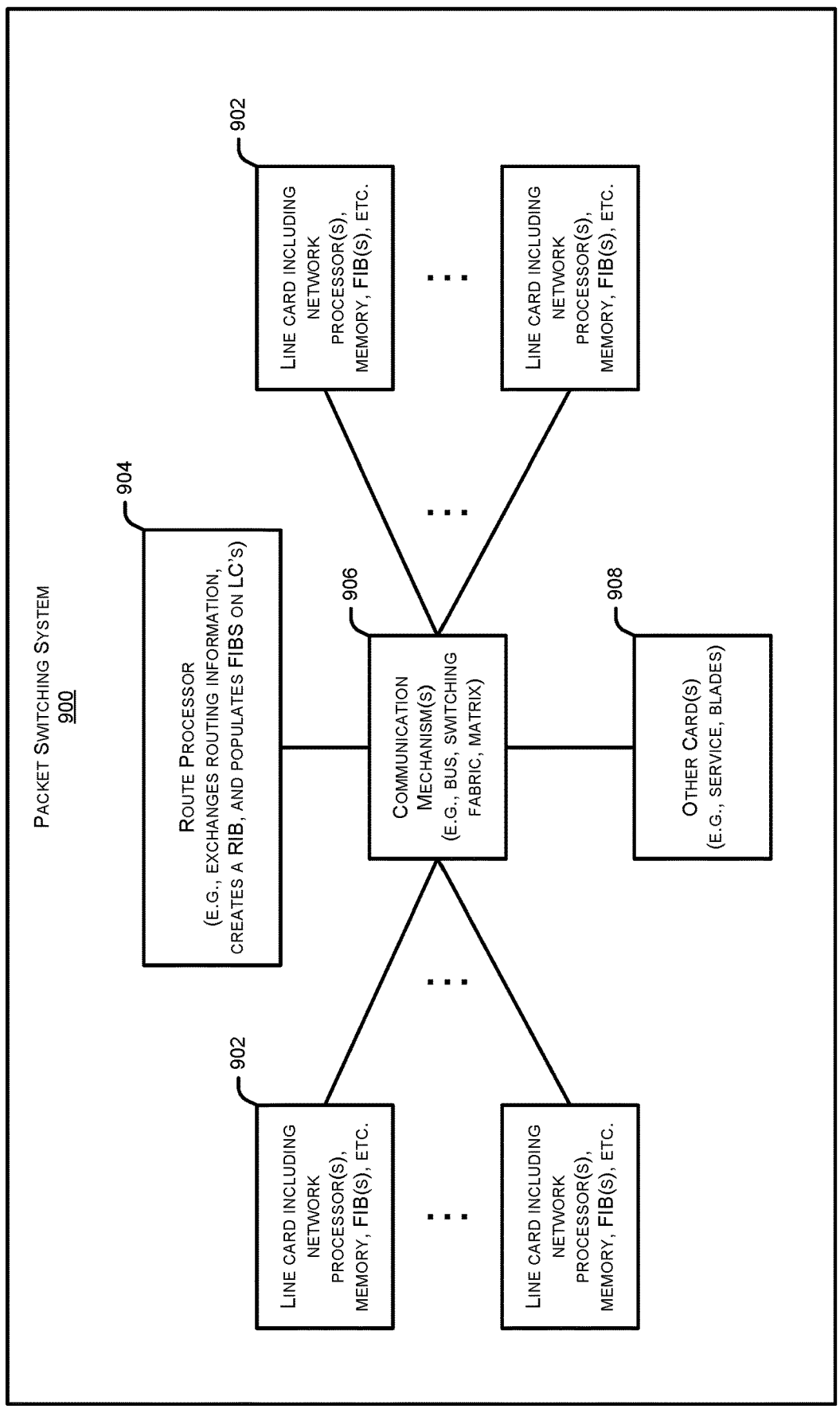
FIG. 9 is a block diagram illustrating an example packet switching system that can be utilized to implement various aspects of the technologies disclosed herein.

FIG. 9 is a block diagram illustrating an example packet switching system 900 (or packet switching device) that can be utilized to implement various aspects of the technologies disclosed herein. In some examples, the packet switching system 900 may be employed in various networks and architectures, such as those described herein. For instance, the FC device 102 and the FC peer device 104 may include similar components as the packet switching system 900.

In some examples, the packet switching system 900 may comprise multiple line card(s) 902, each with one or more network interfaces for sending and receiving packets over communications links (e.g., possibly part of a link aggregation group). The packet switching system 900 may also have a control plane with one or more route processor 904 elements for managing the control plane and/or control plane processing of packets associated with forwarding of packets in a network, including, but not limited to, exchanging routing information, creating routing information base(s) (RIBs), and/or populating forward information base(s) (FIBs) on LCs. The packet switching system 900 may also include other cards 908 (e.g., service cards, blades) which include processing elements that are used to process (e.g., forward/send, drop, manipulate, change, modify, receive, create, duplicate, apply a service) packets associated with forwarding of packets in a network. The packet switching system 900 may comprise hardware-based communication mechanism 906 (e.g., bus, switching fabric, and/or matrix, etc.) for allowing its different entities to communicate. Line card(s) 902 may typically perform the actions of being both an ingress and/or an egress line card 902 in regard to multiple other particular packets and/or packet streams being received by, or sent from, packet switching system 900.

Figure 10:
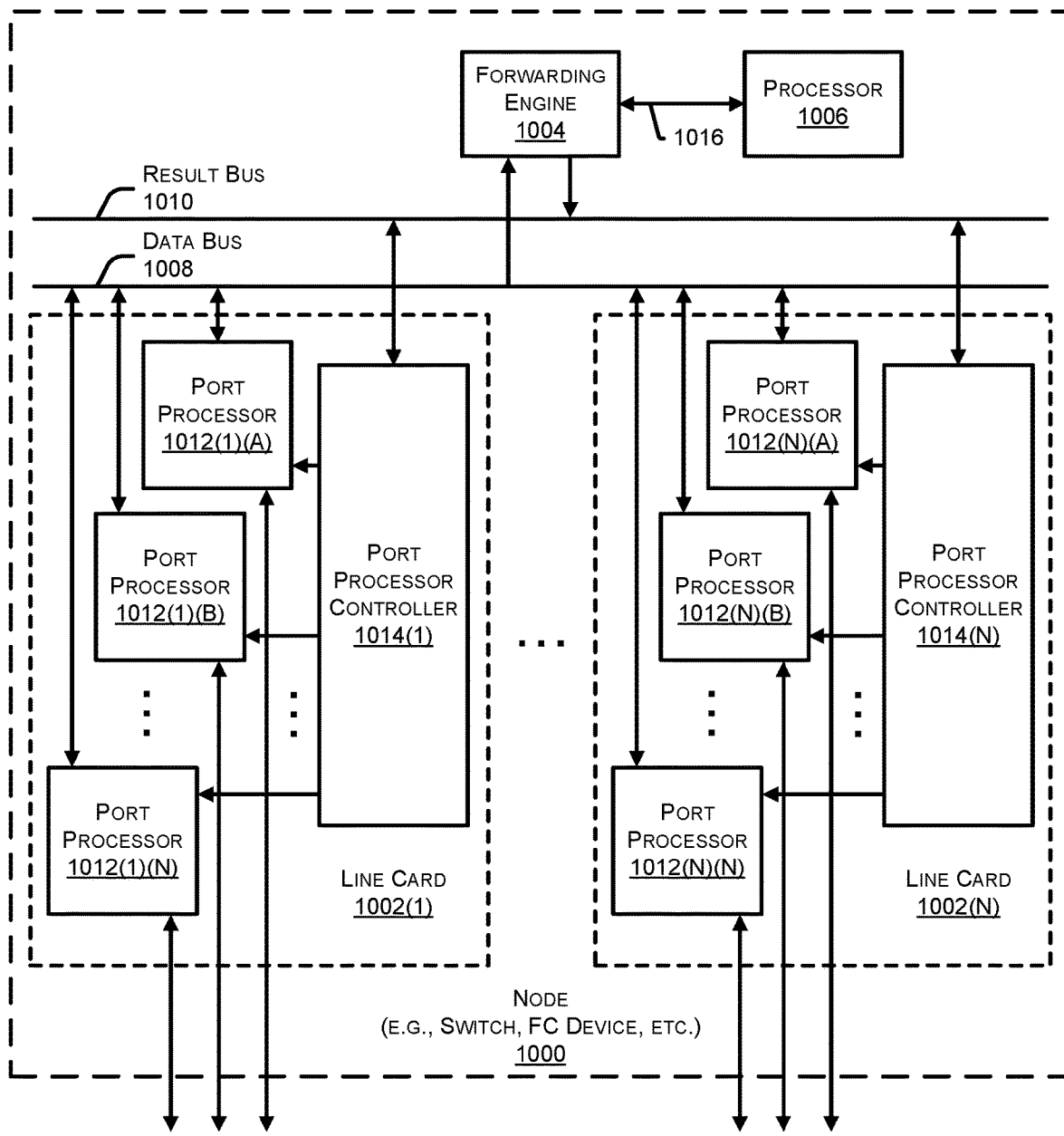
FIG. 10 is a block diagram illustrating certain components of an example node that can be utilized to implement various aspects of the technologies disclosed herein.

FIG. 10 is a block diagram illustrating certain components of an example node 1000 that can be utilized to implement various aspects of the technologies disclosed herein. In some examples, node(s) 1000 may be employed in various architectures and networks. For instance, the FC device 102 and the FC peer device 104 may include similar components as the node 1000. In examples, the node 1000 may be an FC node that includes FC ports.

In some examples, the node 1000 may include any number of line cards 1002 (e.g., line cards 1002(1)-(N), where N may be any integer greater than 1) that are communicatively coupled to a forwarding engine 1004 (also referred to as a packet forwarder) and/or a processor 1006 via a data bus 1008 and/or a result bus 1010. Line cards 1002(1)-(N) may include any number of port processors 1012(1)(A)-(N)(N) which are controlled by port processor controllers 1014(1)-(N), where N may be any integer greater than 1. Additionally, or alternatively, forwarding engine 1004 and/or processor 1006 are not only coupled to one another via the data bus 1008 and the result bus 1010, but may also communicatively coupled to one another by a communications link 1016.

The processors (e.g., the port processor(s) 1012 and/or the port processor controller(s) 1014) of each line card 1002 may be mounted on a single printed circuit board. When a packet or packet and header are received, the packet or packet and header may be identified and analyzed by node 1000 (also referred to herein as a router) in the following manner. Upon receipt, a packet (or some or all of its control information) or packet and header may be sent from one of port processor(s) 1012(1)(A)-(N)(N) at which the packet or packet and header was received and to one or more of those devices coupled to the data bus 1008 (e.g., others of the port processor(s) 1012(1)(A)-(N)(N), the forwarding engine 1004 and/or the processor 1006). Handling of the packet or packet and header may be determined, for example, by the forwarding engine 1004. For example, the forwarding engine 1004 may determine that the packet or packet and header should be forwarded to one or more of port processors 1012(1)(A)-(N)(N). This may be accomplished by indicating to corresponding one(s) of port processor controllers 1014(1)-(N) that the copy of the packet or packet and header held in the given one(s) of port processor(s) 1012(1)(A)-(N)(N) should be forwarded to the appropriate one of port processor(s) 1012(1)(A)-(N)(N). Additionally, or alternatively, once a packet or packet and header has been identified for processing, the forwarding engine 1004, the processor 1006, and/or the like may be used to process the packet or packet and header in some manner and/or maty add packet security information in order to secure the packet. On a node 1000 sourcing such a packet or packet and header, this processing may include, for example, encryption of some or all of the packet's and/or header's information, the addition of a digital signature, and/or some other information and/or processing capable of securing the packet or packet and header. On a node 1000 receiving such a processed packet or packet and header, the corresponding process may be performed to recover or validate the packet's and/or header's information that has been secured.

Figure 11:
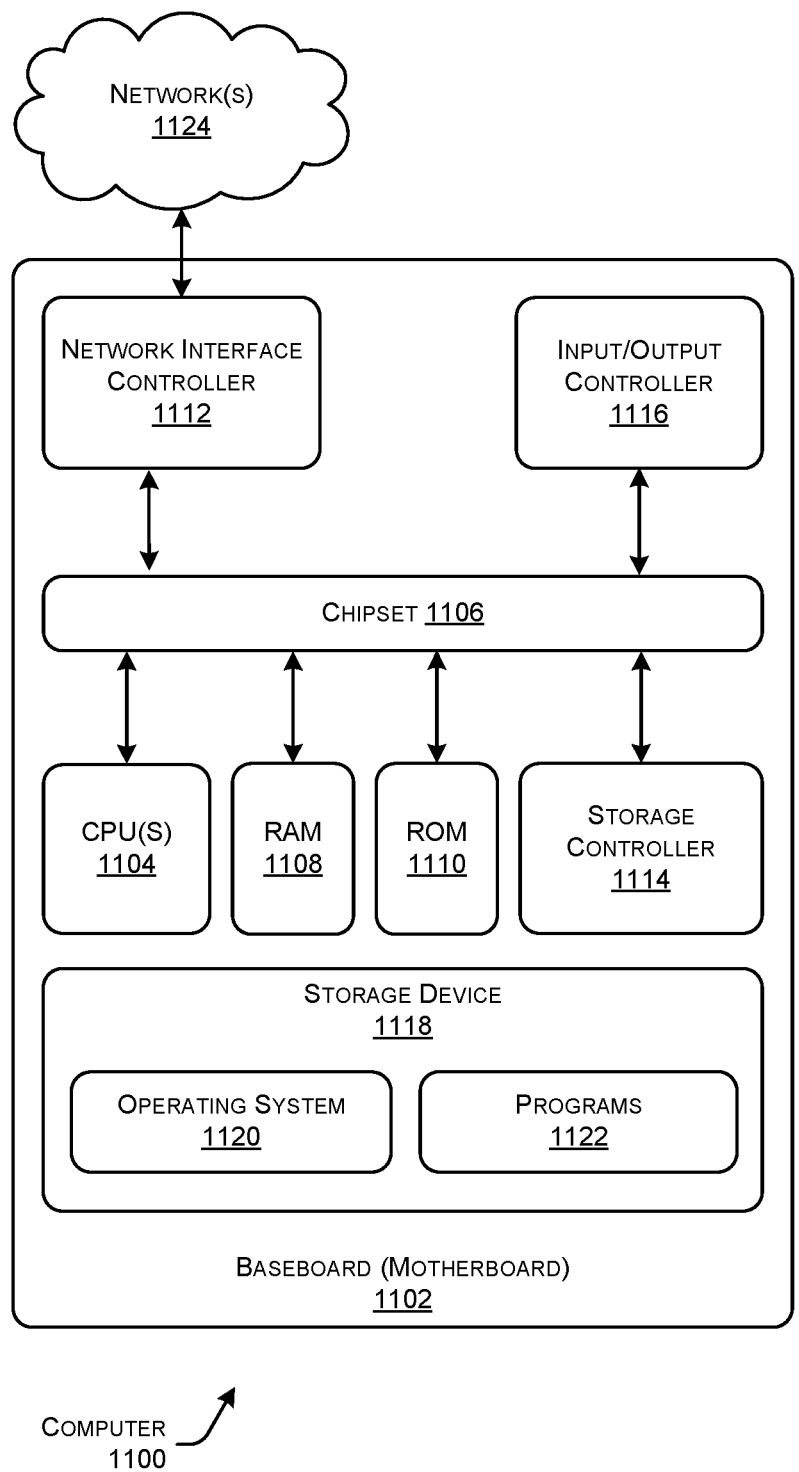
FIG. 11 is a computer architecture diagram showing an illustrative computer hardware architecture for implementing a computing device that can be utilized to implement aspects of the various technologies presented herein.

FIG. 11 is a computer architecture diagram showing an illustrative computer hardware architecture for implementing a computing device that can be utilized to implement aspects of the various technologies presented herein. The computer architecture shown in FIG. 11 may be illustrative of a conventional server computer, router, switch, node, workstation, desktop computer, laptop, tablet, network appliance, e-reader, smartphone, load balancer, or other computing device, and can be utilized to execute any of the software components presented herein.

The computer 1100 includes a baseboard 1102, or "motherboard," which is a printed circuit board to which a multitude of components or devices can be connected by way of a system bus or other electrical communication paths. In one illustrative configuration, one or more central processing units ("CPUs") 1104 operate in conjunction with a chipset 1106. The CPUs 1104 can be standard programmable processors that perform arithmetic and logical operations necessary for the operation of the computer 1100.

The CPUs 1104 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1106 provides an interface between the CPUs 1104 and the remainder of the components and devices on the baseboard 1102. The chipset 1106 can provide an interface to a RAM 1108, used as the main memory in the computer 1100. The chipset 1106 can further provide an interface to a computer-readable storage medium such as a read-only memory ("ROM") 1110 or non-volatile RAM ("NVRAM") for storing basic routines that help to startup the computer 1100 and to transfer information between the various components and devices. The ROM 1110 or NVRAM can also store other software components necessary for the operation of the computer 1100 in accordance with the configurations described herein.

The computer 1100 can operate in a networked environment using logical connections to remote computing devices and computer systems through a network. The chipset 1106 can include functionality for providing network connectivity through a NIC 1112, such as a gigabit Ethernet adapter. The NIC 1112 is capable of connecting the computer 1100 to other computing devices over the network 1124, such as any of the entities/systems/devices described above with reference to FIGS. 1A-10. It should be appreciated that multiple NICs 1112 can be present in the computer 1100, connecting the computer to other types of networks and remote computer systems. In some examples, the NIC 1112 may be configured to perform at least some of the techniques described herein.

The computer 1100 can be connected to a storage device 1118 that provides non-volatile storage for the computer. The storage device 1118 can store an operating system 1120, programs 1122, and data, which have been described in greater detail herein. The storage device 1118 can be connected to the computer 1100 through a storage controller 1114 connected to the chipset 1106. The storage device 1118 can consist of one or more physical storage units. The storage controller 1114 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1100 can store data on the storage device 1118 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1118 is characterized as primary or secondary storage, and the like.

For example, the computer 1100 can store information to the storage device 1118 by issuing instructions through the storage controller 1114 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1100 can further read information from the storage device 1118 by detecting the physical states or characteristics of one or more particular locations within the physical storage units.

In addition to the mass storage device 1118 described above, the computer 1100 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1100. In some examples, the operations performed by the architecture illustrated in FIGS. 1A-5 and or any components included therein, may be supported by one or more devices similar to computer 1100. Stated otherwise, some or all of the operations performed by the architecture illustrated in FIGS. 1A-5 and or any components included therein, may be performed by one or more computer devices, which may be similar to the computer 1100, operating in a scalable arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1118 can store an operating system 1120 utilized to control the operation of the computer 1100. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 1118 can store other system or application programs and data utilized by the computer 1100.

In one embodiment, the storage device 1118 or other computer-readable storage media is encoded with computer-executable instructions which, when loaded into the computer 1100, transform the computer from a general-purpose computing system into a special-purpose computer capable of implementing the embodiments described herein. These computer-executable instructions transform the computer 1100 by specifying how the CPUs 1104 transition between states, as described above. According to one embodiment, the computer 1100 has access to computer-readable storage media storing computer-executable instructions which, when executed by the computer 1100, perform the various processes and functionality described above with regard to FIGS. 1A-10, and herein. The computer 1100 can also include computer-readable storage media having instructions stored thereupon for performing any of the other computer-implemented operations described herein.

The computer 1100 can also include one or more input/output controllers 1116 for receiving and processing input from a number of input devices, such as a keyboard, a mouse, a touchpad, a touch screen, an electronic stylus, or other type of input device. Similarly, an input/output controller 1116 can provide output to a display, such as a computer monitor, a flat-panel display, a digital projector, a printer, or other type of output device. It will be appreciated that the computer 1100 might not include all of the components shown in FIG. 11, can include other components that are not explicitly shown in FIG. 11, or might utilize an architecture completely different than that shown in FIG. 11.

The computer 1100 may include one or more hardware processors (processors) configured to execute one or more stored instructions. The processor(s) may comprise one or more cores. Further, the computer 1100 may include one or more network interfaces configured to provide communications between the computer 1100 and other devices. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 1122 may comprise any type of programs or processes to perform the techniques described in this disclosure for moving buffers between ports or VLs of an FC device while maintaining the ports/VLs in an active state without dropping any frames.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for moving buffers between ports of a Fibre Channel (FC) device while maintaining the ports in an active state, the method comprising:
   determining that a number of the buffers allocated to a first port of the FC device are to be reallocated to a second port of the FC device;
   causing a peer port connected to the first port to decrement, by the number, a transmit credit counter associated with the peer port;
   based at least in part on determining that the peer port decremented the transmit credit counter, releasing the number of the buffers from a buffer pool associated with the first port; and
   causing a reallocation of the number of the buffers to the second port.

2. The method of claim 1, further comprising:
   based at least in part on determining that the number of the buffers are to be reallocated from the first port to the second port, refraining from returning available credits to the peer port; and
   determining that a total number of the available credits meets or exceeds the number of buffers that are to be reallocated.

3. The method of claim 2, wherein causing the peer port to decrement the transmit credit counter comprises sending, to the peer port, an indication of the number of the buffers that are to be reallocated to the second port based at least in part on the total number of the available credits meeting or exceeding the number of the buffers.

4. The method of claim 1, wherein a current value of the transmit credit counter corresponds with a total number of available buffers for an FC frame transmission between the first port and the peer port.

5. The method of claim 1, further comprising:
   based at least in part on determining that the number of the buffers are to be reallocated from the first port to the second port, causing a transmit credit hold on the peer port;
   receiving, from the peer port, an indication that the peer port decremented the transmit credit counter by the number of the buffers to be reallocated; and based at least in part on receiving the indication, decrementing a receive credit counter on the first port by the number.

6. The method of claim 1, wherein causing the reallocation of the number of the buffers to the second port comprises:
increasing, by the number, a receive credit counter associated with the second port based at least in part on the first port releasing the number of the buffers from the buffer pool; and
causing a second peer port connected to the second port to increase, by the number, a transmit credit counter associated with the second peer port.

7. The method of claim 1, wherein the FC device is at least one of an FC switch or an endpoint device that includes FC ports, the endpoint device comprising at least one of a host or a storage system.

8. The method of claim 1, wherein the transmit credit counter is indicative of at least one of a total number of the buffers allocated to the first port or a remainder of the total number of the buffers that are available for frame transmission from the peer port to the first port.

9. The method of claim 1, further comprising determining whether to reallocate the buffers from the first port to the second port using a transmit credit hold process or a receive credit hold process based at least in part on capabilities associated with the FC device.

10. A system comprising:
one or more processors; and
one or more non-transitory computer-readable media storing instructions that, when executed, cause the one or more processors to perform operations comprising:
determining that a number of buffers allocated to a first port of a Fibre Channel (FC) device are to be reallocated to a second port of the FC device while maintaining the first port and the second port in an active state;
causing a peer port connected to the first port to decrement, by the number, a transmit credit counter associated with the peer port;
based at least in part on determining that the peer port decremented the transmit credit counter, releasing the number of the buffers from a buffer pool associated with the first port; and
causing a reallocation of the number of the buffers to the second port.

11. The system of claim 10, the operations further comprising:
based at least in part on determining that the number of the buffers are to be reallocated from the first port to the second port, refraining from returning available credits to the peer port; and
determining that a total number of the available credits meets or exceeds the number of buffers that are to be reallocated.

12. The system of claim 11, wherein causing the peer port to decrement the transmit credit counter comprises sending, to the peer port, an indication of the number of the buffers that are to be reallocated to the second port based at least in part on the total number of the available credits meeting or exceeding the number of the buffers.

13. The system of claim 10, further comprising determining whether to reallocate the buffers from the first port to the second port using a transmit credit hold process or a receive credit hold process based at least in part on capabilities associated with the FC device.

14. The system of claim 10, the operations further comprising:
based at least in part on determining that the number of the buffers are to be reallocated from the first port to the second port, causing a transmit credit hold on the peer port;
receiving, from the peer port, an indication that the peer port decremented the transmit credit counter by the number of the buffers to be reallocated; and
based at least in part on receiving the indication, decrementing a receive credit counter on the first port by the number.

15. The system of claim 10, wherein causing the reallocation of the number of the buffers to the second port comprises:
increasing, by the number, a receive credit counter associated with the second port based at least in part on the first port releasing the number of the buffers from the buffer pool; and
causing a second peer port connected to the second port to increase, by the number, a transmit credit counter associated with the second peer port.

16. A Fibre Channel (FC) device comprising;
a port;
a processor; and
a non-transitory computer-readable medium storing instructions that, when executed, causes the processor to perform operations comprising:
determining that a number of buffers are to be reallocated from a first virtual lane (VL) of the port to a second virtual lane of the port while maintaining the port in an active state;
causing a peer port connected to the first VL to decrement, by the number, a transmit credit counter associated with the peer port;
based at least in part on determining that the peer port decremented the transmit credit counter, releasing the number of the buffers from a buffer pool associated with the first VL; and
causing the number of the buffers to be reallocated to the second VL.

17. The FC device of claim 16, the operations further comprising:
based at least in part on determining that the number of the buffers are to be reallocated from the first VL to the second VL, refraining from returning available credits to the peer port; and
determining that a total number of the available credits meets or exceeds the number of buffers that are to be reallocated.

18. The FC device of claim 16, the operations further comprising:
based at least in part on determining that the number of the buffers are to be reallocated from the first VL to the second VL, causing a transmit credit hold on the peer port;
receiving an indication that the peer port decremented the transmit credit counter by the number of the buffers to be reallocated; and
based at least in part on receiving the indication, decrementing a receive credit counter on the first VL by the number.

19. The FC device of claim 16, wherein causing the reallocation of the number of the buffers to the second VL comprises:

increasing, by the number, a receive credit counter associated with the second VL based at least in part on the first VL releasing the number of the buffers from the buffer pool; and causing a second peer port connected to the second VL to increase, by the number, a transmit credit counter associated with the second peer port.

20. The FC device of claim 16, further comprising determining, based at least in part on application-specific integrated circuit (ASIC) capabilities associated with the port, whether to reallocate the buffers from the first VL to the second VL using a transmit credit hold process or a receive credit hold process.

* * * * *